J. W. DENMEAD.
CLUTCH.
APPLICATION FILED JULY 30, 1909.

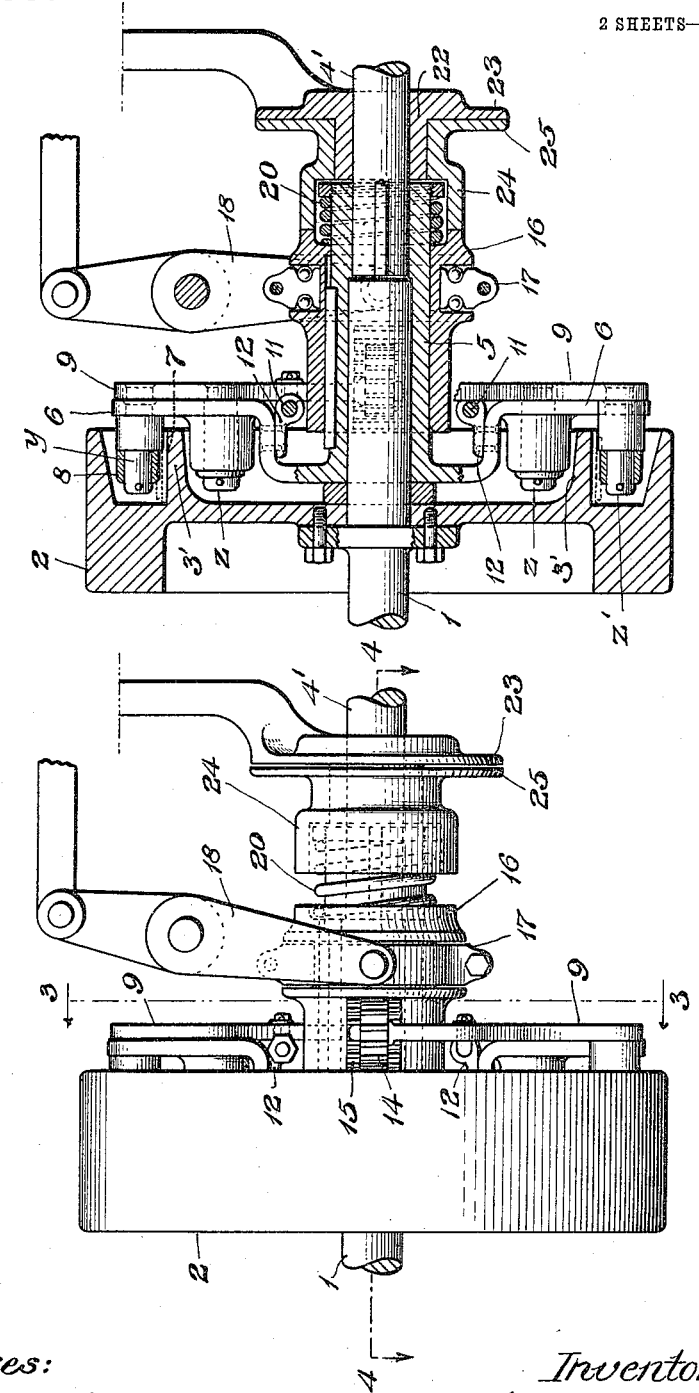

1,042,409.

Patented Oct. 29, 1912.

2 SHEETS—SHEET 2.

Witnesses:

Inventor:
John W. Denmead,
By

Attorney.

UNITED STATES PATENT OFFICE.

JOHN W. DENMEAD, OF AKRON, OHIO, ASSIGNOR TO THE DIAMOND MATCH COMPANY, OF CHICAGO, ILLINOIS, A CORPORATION OF ILLINOIS.

CLUTCH.

1,042,409. Specification of Letters Patent. Patented Oct. 29, 1912.

Application filed July 30, 1909. Serial No. 510,397.

*To all whom it may concern:*

Be it known that I, JOHN W. DENMEAD, a citizen of the United States, and resident of Akron, in the county of Summit and State of Ohio, have invented certain new and useful Improvements in Clutches, of which the following is a specification.

This invention relates to friction clutches; its object being to provide a simple, compact and durable construction possessing efficient clutching and locking power, as will hereinafter appear.

Although the invention has been especially designed for use in connection with the driving mechanism of heavy automobile trucks, yet it is to be understood that the device is applicable to other structures.

It is also to be understood that while I have herein illustrated a preferred form of embodiment of my invention, yet the details of the device may be modified in many respects without departing from the fair spirit of the invention.

Figure 4:
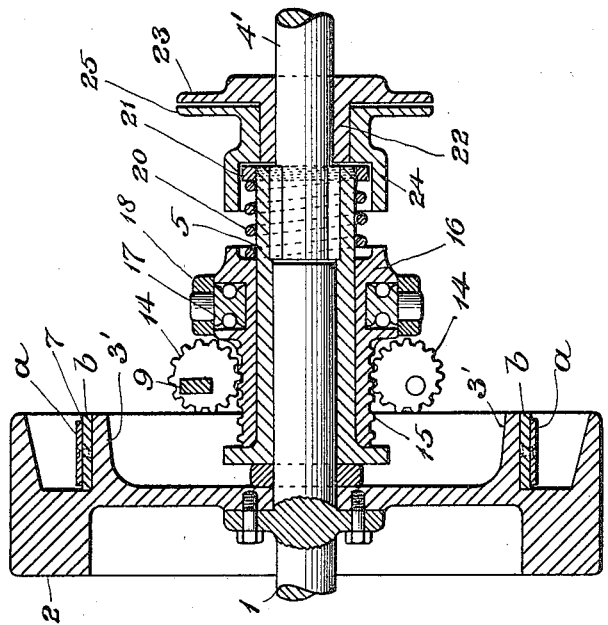
Figure 3:
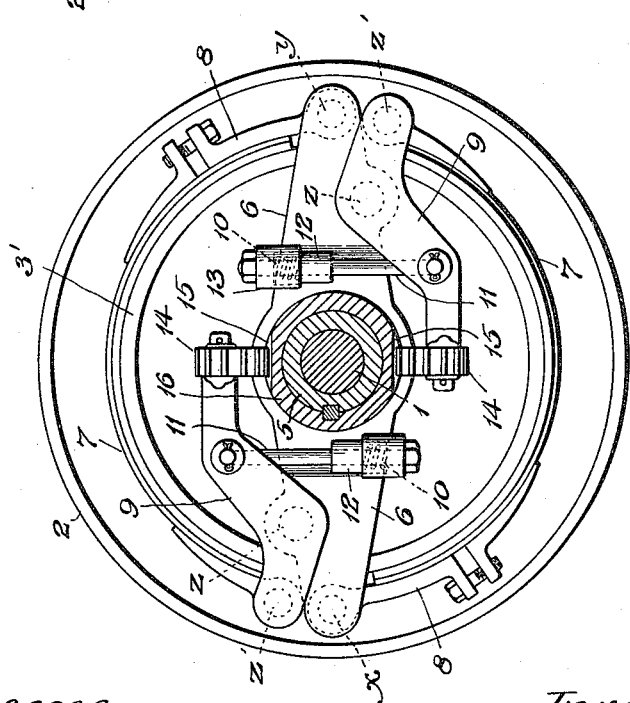

In the drawings—Figure 1 is a side elevation of a clutch embodying my invention, the rotating elements being illustrated as locked thereby. Fig. 2 is a longitudinal vertical section thereof with the parts represented as unlocked. Fig. 3 is a transverse vertical section, as on the line 3—3 of Fig. 1. Fig. 4 is a longitudinal section, as on the line 4—4 of Fig. 1.

1 is a power driven shaft carrying a wheel 2, which, for purposes of illustration, may be regarded as a fly wheel. On the inner side of this wheel, concentric therewith, is an annular flange 3′ which constitutes a clutch ring.

4′ is a secondary or transmission shaft adjacent to and in axial alinement with the shaft 1 and adapted to be periodically driven thereby. On the end of the shaft 4′ is keyed, or otherwise affixed, a relatively long hub 5 which freely receives the adjacent end of the shaft 1, extends within the plane of the clutch ring, and is provided with radial arms 6 which are conveniently offset to lie in front of and beyond the ring. In the present instance two diametrically-opposite arms are employed, to the outer or free ends of which are jointed, as at *x* and *y*, the respective sections of a two-part clutch band 7. As herein indicated, each of these band sections embodies a steel segment, *a*, having an inner facing *b*, of wood fiber or other good frictional material, the section being secured at one of its extremities to a joint member 8 which is pivoted to the proximate arm 6.

9, 9 are two radially-extending levers fulcrumed to the respective arms 6, as at *z*. The outer ends of these levers are jointed with the free ends of the respective clutch bands, as at *z′*. Suitably-disposed springs 10, encircling rods 11 on the inner arms of the respective levers, tend to maintain said arms normally inward and thus open or free the clutch band from the ring 3′ of the wheel. Each of the rods is pivoted to its lever arm and extended loosely through an eye in a bracket 12 projecting from the adjacent supporting arm 6, the spring being interposed between such bracket and a socketed head 13 on the rod. The inner arms of the levers 9 are equipped with eccentrically-mounted pinions 14 which mesh with rack teeth 15 on a sleeve 16, which is splined on the hub so as to be slidable longitudinally thereof and yet be rotatable concurrently therewith. Hence, if the sleeve be moved toward or from the wheel, the two eccentric pinions will be simultaneously rotated, their eccentricity in one case effecting the forcible outward movement of the inner arms of the levers 9 to apply the clutch, or, in the other case, permitting the release of the clutch by the action of the springs 10. When the sleeve is moved toward the wheel, the two parts of the clutch band are drawn tightly about the clutch ring of the wheel; the co-acting gear racks and pinions, by virtue of the eccentricity of the latter, securely locking the parts in the relative positions which they have been caused to assume. When the sleeve is moved outward, or away from the wheel, the band is expanded or withdrawn from the clutch ring.

It is to be noted that during the inward movement of the sleeve, the positive rotation of the pinions on their eccentric axes insures a steady progressive pressure upon the levers to accomplish the efficient application of the clutch, and that the pinions when they have reached the greatest extent of their throw, exert the maximum force upon the levers. It is at this point that the parts are locked.

Any suitable or approved means for operating the sleeve may be employed. In the present instance, the sleeve is provided with a rotatable ring or collar 17 to which is pivotally connected a yoke lever 18 by the operation of which the sleeve may be moved longitudinally of its shaft to apply or release the clutch. The sleeve is maintained normally in its inward or locking position by means of a stout spring 20 which, encircling the hub, is interposed between the sleeve and a suitably-located stop on the hub, as for example, the screw-ring 21.

In order to retard the rotation of the transmission shaft, and its appurtenances, when the clutch has been released, I preferably provide for the said shaft, adjacent the hub, a fixed bearing 22 having a friction disk 23, and I loosely mount on the bearing a collar 24 having an opposing friction disk 25. The collar partially surrounds the spring 20 and extends into the path of the sleeve 16, whereby in the continued advancement of the latter, after the clutch has been released, the sleeve abuts against the opposing end of the friction collar and forces it against the stationary disk with the braking effect mentioned. (See Fig. 2.)

It is manifest that my invention may be readily applied to and used in connection with a constantly rotating shaft carrying a loosely mounted wheel which is adapted to be made fast or loose at will. In that case the two shafts 1 and 4' (Fig. 1) may be regarded as a single constantly driven shaft with the wheel 2 loose thereon; the other parts being constructed, arranged and adapted to operate as hereinbefore described.

I claim—

1. In a clutch, the combination with two rotatable elements having complementary clutch members, of a lever for actuating the clutch member of one of said elements, whereby the two elements may be connected or disconnected, means on one of said elements for supporting the lever, an eccentrically mounted rotary member on said lever, and means movable relatively to the lever-bearing element and engaged with the eccentrically-mounted member.

2. In a clutch, the combination with two rotatable elements having complementary clutch members, of two oppositely-disposed levers for actuating the clutch member of one of said elements, whereby the two elements may be connected or disconnected, means on one of said elements for supporting the levers, eccentrically-mounted rotary members on the respective levers, and means movable relatively to the lever-bearing element and engaged with the respective eccentrically-mounted members.

3. In a clutch, the combination with two rotatable elements having complementary clutch members, of a lever for actuating the clutch member of one of said elements whereby the two elements may be connected or disconnected, means on one of said elements for supporting the lever, a pinion eccentrically mounted on said lever, and a gear rack movable relatively to said lever bearing element and meshing with the pinion.

4. In a clutch, the combination with two rotatable elements having complementary clutch members, of two oppositely-disposed levers for actuating the clutch member of one of said elements, whereby the two elements may be connected or disconnected, means on one of said elements for supporting the levers, pinions eccentrically mounted on the respective levers, and a slide on said lever-bearing element provided with oppositely-disposed rack teeth in mesh with the respective pinions.

5. In a clutch, the combination with a shaft, and a wheel thereon having a clutch member, of a second shaft, a clutch band adapted to be engaged with and released from said clutch member, a lever connected with said band, a lever support on said second shaft, a pinion eccentrically mounted on said lever, and a rack movable longitudinally of said second shaft and meshing with the pinion.

6. In a clutch, the combination with a shaft, and a wheel thereon having a clutch member, of a second shaft, a two-part expansible clutch band adapted to be engaged with and released from said clutch member, two oppositely-disposed levers connected with the respective parts of the band, a lever support on said second shaft, pinions eccentrically mounted on said levers respectively, and a slide on said second shaft provided with oppositely-disposed rack teeth in mesh with the respective pinions.

Signed at Barberton, in the county of Summit and State of Ohio this 21st day of July, 1909.

JOHN W. DENMEAD.

Witnesses:
B. C. Ross,
F. M. Root.

Copies of this patent may be obtained for five cents each, by addressing the "Commissioner of Patents, Washington, D. C."